(12) United States Patent
Wang

(10) Patent No.: US 6,750,279 B1
(45) Date of Patent: Jun. 15, 2004

(54) HIGH TEAR STRENGTH LOW COMPRESSION SET HEAT CURABLE SILICONE ELASTOMER AND ADDITIVE

(75) Inventor: Yi-Feng Wang, Waterford, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/636,497

(22) Filed: Aug. 11, 2000

(51) Int. Cl.[7] .................................................. C08K 5/05
(52) U.S. Cl. ........................ 524/380; 524/379; 524/383; 524/384; 524/385; 524/588; 528/15; 528/31; 528/32
(58) Field of Search ............................... 528/15, 31, 32; 524/379, 380, 383, 384, 385

(56) References Cited

U.S. PATENT DOCUMENTS

| 4,929,669 | A | * | 5/1990 | Jensen |
| 5,859,094 | A | * | 1/1999 | Conway et al. |
| 5,989,719 | A | * | 11/1999 | Loiselle |
| 5,998,516 | A | * | 12/1999 | Burkus et al. ................. 524/86 |

* cited by examiner

*Primary Examiner*—Margarita G. Moore
*Assistant Examiner*—Marc S. Zimmer

(57) ABSTRACT

A high tear strength, low compression set, low cost heat curable silicon elastomer.

14 Claims, No Drawings

HIGH TEAR STRENGTH LOW COMPRESSION SET HEAT CURABLE SILICONE ELASTOMER AND ADDITIVE

FIELD OF THE INVENTION

The invention relates to high tear strength, low compression set, low cost heat curable silicone elastomers.

BRIEF DESCRIPTION OF THE RELATED ART

Silicone heat curable elastomers (HCE) generally consist of diorganopolylsiloxane gum, fluid and silica filler. Silica filler acts as a reinforcing component to provide mechanical strength. Generally, fumed silica based HCE compounds provide good mechanical properties with intermediate tear strength and poor compression set.

Current HCE compounds are typically molded and produce products exhibiting excellent tear resistance with compression sets greater than 70%, thus requiring post baking to reduce the compression set to less than 40%. It would also be a great benefit to obtain an addition cure HCE with low compression set immediately upon molding while maintaining excellent tear strength and Shore A hardness. It would be a great benefit to obtain a HCE system offering low cost, good mechanical properties, high tear strength and low compression set upon curing, eliminating the need for post baking.

SUMMARY OF THE INVENTION

The present invention is directed to a curable composition comprising: (a) an alkenyl terminated linear diorganopolysiloxane gum; (b) an alkenyl containing diorganopolysiloxane gum; (c) a precipitated silica reinforcing filler with surface area of from about 90 to 300 m²/g; (d) a hydroxy terminated polysiloxane fluid; (e) an organohydrogenpolysiloxane; (f) a low compression set additive; (g) an addition-cure catalyst, and to a silicone elastomer formed by curing the composition. The cured silicone elastomer has high tear strength and low compression set upon curing and is produced at a lower cost.

Precipitated silica filler based HCE compounds provide excellent compression set but traditionally exhibit poor tear strength. The precipitated silica filler offers significant cost savings versus fumed silica filler. When used in combination with the low compression set additive of the present invention, a HCE compound providing high tear strength and low compression set is produced.

DETAILED DESCRIPTION OF THE INVENTION

In a preferred embodiment, the composition of the present invention comprises, based on 100 parts by weight of the composition, from 60 to 98 parts by weight ("pbw"), even more preferably from 75 to 95 pbw, of the alkenyl terminated diorganopolysiloxane gum; from 2 to 40 pbw, even more preferably from 15 to 25 pbw, of the alkenyl-containing diorganopolysiloxane gum; from 10 to 200 pbw, even more preferably from 20 to 80 pbw, of the precipitated silica; from 0.1 to 10.0 pbw, even more preferably from 0.5 to 5.0 pbw of the hydroxy terminated polysiloxane; 0.1 to 30 parts by weight of the organohydrogenpolysiloxane; an effective amount of the low compression set additive; and an effective amount of a catalyst.

Compounds suitable as the alkenyl terminated gum component of the composition of the present invention include, for example, vinyl, propenyl, and butenyl terminated gums. In a preferred embodiment, the alkenyl terminated diorganopolysiloxane gum is a vinyl terminated dialkylpolysiloxane gum, more preferably a vinyl terminated dimethylpolysiloxane gum or a vinyl terminated poly(dimethylsiloxane-co-methylvinylsiloxane).

In a preferred embodiment, the alkenyl terminated diorganopolysiloxane is one according to the formula:

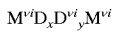

where $M^{vi}$ is $R^1R^2_2SiO_{3/2}$

D is $R^3_2SiO_{2/2}$;

$D^{vi}$ is $R^4R^5SiO_{2/2}$;

where $R^1$ and $R^4$ are each independently $(C_2–C_6)$alkenyl, preferably vinyl, $R^2$, $R^3$ and $R^5$ are each independently $(C_1–C_6)$alkyl or $(C_2–C_6)$alkenyl, preferably $(C_1–C_6)$alkyl, more preferably methyl, and x and y are chosen so that the viscosity of the gum is in the range of from about 1,000,000 to about 200,000,000 centipoise at 25° C., and having an alkenyl concentration of about 0.001 to about 0.01 mole percent of siloxy units. In one preferred embodiment, preferably, y is 0.

As used herein, "$(C_1–C_6)$alkyl" means a straight or branched chain alkyl group containing from 1 to 6 carbon atoms per group, such as, for example, methyl, ethyl, propyl, and butyl.

As used herein, "$(C_2–C_6)$alkenyl" means a straight or branched chain alkenyl group containing from 2 to 6 carbon atoms per group and at least one double bond between two carbon atoms per group, such as, for example, vinyl, propenyl and butenyl.

Compounds suitable as the alkenyl-containing diorganopolysiloxane gum component of the present composition include, for example, vinyl-, propenyl- and butenyl-containing gums. In a preferred embodiment, the alkenyl units are on-chain. As used herein, "on-chain" means that the alkenyl units are on di-organo-functional siloxane units of the gum. In a preferred embodiment, the alkenyl-containing diorganopolysiloxane gum is a vinyl-containing dialkylpolysiloxane, preferably a vinyl-containing dimethylpolysiloxane, even more preferably trimethyl-terminated poly(dimethylsiloxane-co-methylvinylsiloxane).

In a preferred embodiment, the alkenyl-containing diorganopolysiloxane gum is one according to the formula:

where M is $R^6_3SiO_{3/2}$,

D and $D^{vi}$ are as previously described, each $R^6$ is independently $(C_1–C_6)$alkyl or $(C_2–C_6)$alkenyl, preferably $(C_1–C_6)$alkyl, more preferably methyl, where w and z are chosen so that viscosity ranges from about 100,000 to about 200,000,000 centipoise at 25° C. and having an alkenyl concentration of from about 0.5 to about 15 mole percent of siloxy units.

Compounds suitable as the non-fumed silica filler are those that have reinforcing properties for silicone elastomers, such as precipitated silicas and silica gels, preferably precipitated silicas. At least part of the non-fumed silica filler must be a precipitated silica reinforcing filler having a surface area of from about 90 to about 300 m²/g. Non-fumed silica fillers are known in the art and are commercially available. An example of a non-fumed silica filler suitable for use in the present invention is DeGussa FK-140® precipitated silica, commercially available from DeGussa (New Jersey).

In a preferred embodiment, the hydroxy terminated polysiloxane is one according to the structural formula:

$$MD_a D^{vi}_b M$$

where M is $R^7 R^6_2 SiO_{3/2}$,

D and $D^{vi}$ are as previously defined such that the alkenyl content is from 0 to about 2.0 mole percent, each $R^6$ is as previously defined, $R^7$ is OH, a and b are chosen such that the viscosity is from about 25 to about 40 centistokes at 25° C.

In a preferred embodiment, the hydride-containing polysiloxane is one according to the structural formula:

$$M^H D_c D^H_d M^H$$

where $M^H$ is $R^8 R^6_2 SiO_{3/2}$, $D^H$ is $R^9 R^6 SiO_{2/2}$, each $R^6$ is as previously defined, $R^8$ and $R^9$ are each H, and c and d are chosen such that the viscosity is from about 10 to about 1000 centipoise at 25° C. and the hydride content is from about 0.05 to about 5.0 percent by weight, subject to the limitation that the molar ratio of the hydride and vinyl content in the composition must be greater than or equal to 4, preferably greater than 6, more preferably from about 6 to about 11.

Compounds suitable as the low compression set additive are those that effectively reduce compression set of the cured silicone elastomer, inhibit cure at room temperature and prevent unwanted cure. Examples of the low compression set additive for use in the present invention include, but are not limited to, acetylene alcohols such as 1-ethynl-1-cyclohexanol ("ECH"), 9-ethynyl-9-fluorenol, and the like, preferably ECH and 9-ethynyl-9-fluorenol, and peroxide inhibitors such as methylethylketone peroxide, and the like, preferably, methylethylketone peroxide. The acetylene alcohols and peroxide inhibitors are known in the art and are available commercially.

In a preferred embodiment, the low compression set additive is an acetylene alcohol having the formula:

$$H-C\equiv C-R^{10}-OH$$

wherein $R^{10}$ is a divalent hydrocarbon radical comprising from 6 to 40 carbon atoms where the structure of $R^{10}$ may be any combination of linear, branched, aliphatic, aromatic, cycloaliphatic and olefinic, with the limitation that the alcohol is always α to the acetylene group. Preferably, the low compression set additive is 1-ethynyl-1-cydohexanol or 9-ethynyl-9-fluorenol.

Compounds suitable as the catalyst in the present invention are known in the art. Examples of effective catalysts for use in the present invention are platinum and complexes of platinum that provide at least 0.1 parts per million of platinum in terms of platinum metal. Examples of suitable platinum catalysts include, but are not limited to, platinum black, chloroplatinic acid, alcohol modified chloroplatinic acid, and complexes of chloroplatinic acid with olefins, aldehydes, vinylsiloxanes or acetylene alcohols. A preferred catalyst for use in the present invention is a Karstedt catalyst.

Other optional additives used in the compositions of the present invention are coloring agents and pigments, and standard additives known in the art to improve heat aging and oil immersion, such as iron oxide, extending fillers such as micro mica, cerium hydroxide, and the like.

The process for forming this composition can be either cold mix or hot mix at temperature above 100° C. The cold mix can be achieved using Banbury or Doughmixer equipment. The hot mix can be achieved using either a Doughmixer batch process or an extruder-type continuous process.

The composition of the present invention is used primarily as a heat curable rubber in applications requiring high consistency and malleable compositions. Curing is generally high temperature curing, i.e., at a temperature of about 100° C. or higher.

The heat curable silicone elastomer composition of the present invention may be used in a variety of applications, including, for example, automotive gaskets, electronic keyboards, consumer goods such as baby bottle nipples, and the like.

The examples given below are given for the purpose of illustrating the present invention. All parts are by weight. The following chart describes the components used in the examples:

A—vinyl terminated polydimethylsiloxane gum (viscosity 100,000 to 200,000,000 cps)

B—dimethylvinyl terminated poly(dimethylsiloxane-co-methylvinylsiloxane) (viscosity 1,000,000 to 200,000,000 cps)

C—trimethyl-terminated poly(dimethylsiloxane-co-methylvinylsiloxane) (viscosity 1,000,000 to 200,000,000 cps)

D—hydroxy-terminated polydimethylsiloxane (viscosity 25 to 40 centistokes)

E—hydride containing polysiloxane (35 to 75 centistokes)

F—Filler—non-fumed, precipitated silica filler (90–300 m²/g hydrophilic silicon dioxide)

G—low compression set additive—9-ethynyl-9-fluorenol

H—low compression set additive—ECH

I—Pt catalyst (10% platinum in divinyltetramethyldisiloxane)

EXAMPLES 1 to 5

Precipitated Silica with Low Compression Set, High Tear

In a Farrel Banbury mixer, a platinum catalyst master batch was compounded by combining 2000 grams of component (A) with 20 grams of component (D), 720 grams of component (F) and 10.4 grams of component (I) at a shear rate of 40 r.p.m. at a temperature of from about 20 to about 70° C.

In a Farrel Banbury mixer, a heat curable silicone elastomer composition was compounded by combining 1260 g of component (A) and 380 g of component (C) at a shear rate of 15 r.p.m at 25° C. To this mixture, 40 g of component (D), 54 g of component (E) and 1.2 g of component (H) were added. In addition, to this mixture 880 g of precipitated silica filler (F) was added in three portions. Between each addition of the silica filler, the mixture was mixed with a shear rate of 30 r.p.m at 25 to 70° C. for two minutes. At the end of addition of the silica filler, the compound was mixed further for another 5 minutes with a shear rate of 40 r.p.m at 50 to 70° C.

This compound was catalyzed with 1.0 parts by weight of the platinum catalyst master batch produced in Example 0 per 99 parts by weight of the compound. The cure rate and subsequent cure profile were determined by measuring 7.0 grams of the material on a Monsanto Modulating Disk Rheometer ("MDR") at 350° F. The time to 2% and 90% cure were taken from the resulting profile, as well as the maximum torque and peak rate of cure. This catalyzed compound was presscured for 10 minutes at 177° C. and samples were taken to evaluate the mechanical properties. In addition, the press-cured samples were further postcured by oven baking for 4 hours at 200° C. and the physical properties were evaluated. The results of this example, Example 1, are listed in Table 1.

Examples 2 to 5 were made using the same compounding process Example 1 above, except that the amount of each component was changed (as listed in Tables 2 to 4). The results of the tests are listed in Tables 2 to 4.

Comparative Example—Addition Curable Elastomer With Fumed Silica

Two samples of a commercially available heat curable elastomer containing fumed silica (instead of non-fumed, precipitated silica) were tested in the same manner as Examples 1 to 5. The results are shown in Tables 1 and 3.

EXAMPLE 6

Precipitated Silica With Low Compression Set, High Tear

The compositions of Examples 1 to 5 can also be produced using a hot mixing process, for example, in a Doughmixer. In a lab Doughmixer, a heat curable silicone elastomer composition was compounded by combining 1215 grams of component (A) and 285 grams of component (C) at a shear rate of 2–30 r.p.m. at 25° C. To this mixture 30 grams of component (D) were added. Between each addition of the filler, component (F), the mixture was mixed with a shear rate of 20–30 r.p.m. at 25–70° C. At the end of the additions, the mixture was mixed for another 15 minutes, then heated to 160° C. under a flow of nitrogen and heated for 2 hours at 160° C. At the end of the 2 hour heating, the mixture was cooled to less than 80° C., and 40.5 grams of component (E) and 0.90 grams of component (H) were added and the mixture was further mixed for another 0.5 hours. The compound was then cured and tested in the same manner as described in Example 1. The results are listed in Table 5.

TABLE 1

| Component | Example 1 (pbw) | | | |
|---|---|---|---|---|
| A | 81 | | | |
| C | 19 | | | |
| D | 2 | | | |
| E | 2.7 | | | |
| H | 0.06 | | | |
| F | 44 | | | |
| Platinum Catalyst | 1.0 pts/ 99 pts compound | | | |
| Properties MDR Results @ 350° F. | | | | |
| T02 (m:s) | 0:05 | | | |
| T90 (m:s) | 0:15 | | | |
| Peak Rate (lb.in/min) | 126.80 | | | |
| Maximum Torque (lb.in) | 16.35 | | | |
| | Press Cure | Post Cure | HCE with Fumed Silica* Press Cure | (Comparative Example) Post Cure |
| Molding conditions | 350° F./ 17 min. | 350° F./ 17 min. | 350° F./ 17 min. | 350° F./ 17 min. |
| Post cure conditions | — | 400° F./ 4 hours | — | 400° F./ 4 hours |
| Shore A | 48.2 | 47.9 | 50.0 | 54.0 |
| Tensile strength, psi | 1089 | 1012 | 1426 | 1399 |
| Elongation (%) | 593 | 527 | 861 | 783 |
| Modulus @ 50%, psi | 109 | 108 | — | — |
| Modulus @ 100%, psi | 182 | 178 | 212 | 260 |
| Modulus @ 200%, psi | 346 | 342 | — | — |
| Tear B, ppi | 206 | 209 | 311 | 267 |
| Specific gravity | 1.153 | 1.161 | 1.154 | 1.154 |
| Compression Set, 22 hr/177° C. | 23.4 | 25.4 | — | — |

*Commercially available heat curable elastomer containing fumed silica instead of non-fumed silica.

Process condition: Banbury cold mix

Test methods:
Shore A—ASTM D2240
Tensile strength—ASTM D412
Elongation—ASTM D412
Modulus—ASTM D412
Tear B—ASTM D624
Specific Gravity—ASTM D792
Compression Set—ASTM D395

A typical calculation for compression set is:

$$\% \text{ Compression Set} = C = [(Y_0 - Y_1)/(Y_0 - Y_s)] * 100$$

where $Y_0$=initial thickness, $Y_1$=final thickness, and $Y_s$=75% of initial thickness

TABLE 2

| Component (pbw) | Example 2 |
|---|---|
| A | 78 |
| C | 22 |
| D | 2.5 |
| E | 3.3 |
| H | 0.062 |
| F | 50 |
| Platinum Catalyst | 1.0 pts/ 99 pts compound |
| Properties MDR Results @ 350° F. | |
| T02 (m:s) | 0:05 |
| T90 (m:s) | 0:15 |
| Peak Rate (lb.in/min) | 137.80 |
| Maximum Torque (lb.in) | 17.35 |
| | Press Cure | Post Cure |
| Molding conditions | 350° F./17 min. | 350° F./17 min. |
| Post cure conditions | — | 400° F./4 hours |
| Shore A | 51.3 | 52.1 |
| Tensile strength, psi | 1165 | 1119 |
| Elongation (%) | 616 | 558 |
| Modulus @ 50%, psi | 114 | 115 |
| Modulus @ 100%, psi | 194 | 193 |
| Modulus @ 200%, psi | 377 | 383 |
| Tear B, ppi | 219 | 182 |
| Specific gravity | 1.180 | 1.180 |
| Compression Set, 22 hr/177° C. | 24.6 | 22.0 |

TABLE 3

| Component | Example 3 (pbw) |
|---|---|
| A | 83 |
| C | 17 |
| D | 1 |
| E | 2.5 |

TABLE 3-continued

| | |
|---|---|
| H | 0.056 |
| F | 36 |
| Platinum Catalyst | 1.0 pts/99 pts compound |
| Properties MDR Results @ 350° F. | |
| T02 (m:s) | 0:05 |
| T90 (m:s) | 0:20 |
| Peak Rate (lb.in/min) | 73.20 |
| Maximum Torque (lb.in) | 12.43 |

| | Press Cure | Post Cure | HCE with Fumed Silica* Press Cure | (Comparative Example) Post Cure |
|---|---|---|---|---|
| Molding conditions | 350° F./17 min. | 350° F./17 min. | 350° F./17 min. | 350° F./17 min. |
| Post cure conditions | — | 400° F./4 hours | — | 400° F./4 hours |
| Shore A | 40.3 | 42.0 | 41.0 | 44.0 |
| Tensile strength, psi | 976 | 957 | 1338 | 1487 |
| Elongation (%) | 603 | 568 | 917 | 745 |
| Modulus @ 50%, psi | 87 | 94 | — | — |
| Modulus @ 100%, psi | 140 | 151 | 132 | 180 |
| Modulus @ 200%, psi | 259 | 285 | — | — |
| Tear B, ppi | 210 | 224 | 260 | 255 |
| Specific gravity | 1.132 | 1.136 | 1.118 | 1.1118 |
| Compression Set, 22 hr/177° C. | 22.8 | 18.1 | — | — |

*Commercially available heat curable elastomer commercially with fumed silica instead of non-fumed silica.

TABLE 4

| Component | Example 4 (pbw) | Example 5 (pbw) |
|---|---|---|
| A | 90 | 72 |
| C | 10 | 28 |
| D | 1 | 3.5 |
| E | 2.05 | 3.85 |
| H | 0.053 | 0.066 |
| F | 28 | 58 |
| Platinum Catalyst | 1.0 pts/99 pts compound | 1.0 pts/99 pts compound |
| Properties MDR Results @ 350° F. | | |
| T02 (m:s) | 0:05 | 0:05 |
| T90 (m:s) | 0:16 | 0:15 |
| Peak Rate (lb.in/min) | 85.40 | 148.40 |
| Maximum Torque (lb.in) | 11.84 | 19.50 |
| | Press Cure | Press Cure |
| Molding conditions | 350° F./17 min. | 350° F./17 min. |
| Shore A | 35.8 | 57.2 |
| Tensile strength, psi | 1069 | 1137 |
| Elongation (%) | 701 | 478 |
| Modulus @ 100%, psi | 100 | 262 |
| Modulus @ 200%, psi | 177 | 520 |
| Tear B, ppi | 237 | 235 |
| Specific gravity | 1.105 | 1.206 |

TABLE 5

| Component | Example 6 (pbw) | |
|---|---|---|
| Part I | | |
| A | 81 | |
| C | 19 | |
| D | 2 | |
| F | 44 | |
| Part II | | |
| E | 0.056 | |
| H | 2.7 | |
| Platinum Catalyst | 1.0 pts/99 pts compound | |
| Properties MDR Results @ 350° F. | | |
| T02 (m:s) | 0:05 | |
| T90 (m:s) | 0:17 | |
| Peak Rate (lb.in/min) | 123.10 | |
| Maximum Torque (lb.in) | 16.16 | |
| | Press Cure | Post Cure |
| Molding conditions | 350° F./17 min. | 350° F./17 min. |
| Post cure conditions | — | 400° F./4 hours |
| Shore A | 48.6 | 49.1 |
| Tensile strength, psi | 1089 | 1084 |
| Elongation (%) | 486 | 408 |
| Modulus @ 50%, psi | 126 | 133 |
| Modulus @ 100%, psi | 234 | 253 |
| Modulus @ 200%, psi | 448 | 506 |
| Tear B, ppi | 260 | 116 |
| Specific gravity | 1.161 | 1.167 |
| Compression Set, 22 hr/177° C. | 24.4 | 21.6 |

Process conditions: Doughmixer, 160° C. for 2 hours, Part I; after Part II, Doughmixer, 0.5 hours, 40–80° C.
9-ethynyl-9-fluorenol as Low Compression Set Additive

EXAMPLES 7 to 10

The standard base used in examples 7 to 10 was formulated in a Farrel Banbury mixer by compounding 1620 grams of component (A) and 380 grams of component (B) at a shear rate of 15 r.p.m. at 25° C. To this mixture, 40 grams of component (D) and 58 grams of component (E) were added. 880 grams of precipitated filler, component (F), was added to the mixture in three portions. Between each addition of filler, the mixture was mixed at a shear rate of 30 r.p.m. at 25–70° C. for 2 minutes. At the end of the filler addition the compound was mixed for another 5 minutes with a shear rate of 40 r.p.m. at 50–70° C. The platinum catalyst master batch is the same as previously prepared.

To 100 parts of the base material, the appropriate amount of additive was added (see Table 6), in a solvent or master batch where necessary, and the composition was roll milled at lest 25 times to ensure complete dispersion. The resulting composition was catalyzed with 1.0 parts by weight of the Platinum catalyst master batch per 99 parts of the compound. The cure rate and subsequent cure profile was determined by measuring 7.0 grams of the material produced on a Monsanto Modulating Disk Rheometer ("MDR") at 150° C. The time to 90% cure was taken from the resulting profile. This catalyzed compound was press-cured for 10 minutes at 177° C., and samples were taken to evaluate properties. Results are shown in Table 6.

EXAMPLE 11

Comparative Example

A compound was produced in the same manner as in Examples 7 to 10 except that the additive was 1-ethynyl-1- cyclohexanol (ECH). The results of the evaluation are shown in Table 6.

TABLE 6

| Component | Ex. 7 | Ex. 8 | Ex. 9 | Ex. 10 | Ex. 11 (comp.) |
|---|---|---|---|---|---|
| | (pbw) | (pbw) | (pbw) | (pbw) | (pbw) |
| A | 81.0 | 81.0 | 81.0 | 81.0 | 81.0 |
| B | 19.0 | 19.0 | 19.0 | 19.0 | 19.0 |
| D | 2.0 | 2.0 | 2.0 | 2.0 | 2.0 |
| E | 2.9 | 2.9 | 2.9 | 2.9 | 2.9 |
| F | 44.0 | 44.0 | 44.0 | 44.0 | 44.0 |
| Platinum Catalyst | 1 pbw/99 pbw comp. | 1 pbw/99 pbw comp. | 1 pbw/99 pbw comp. | 1 pbw/99 pbw comp. | 1 pbw/99 pbw comp. |
| G | 240 ppm | 265 ppm | 400 ppm | 663 ppm | — |
| H | — | — | — | — | 400 ppm |
| Properties | | | | | |
| T90 @ 150° C. (m:s) | 0:29 | 0:25 | 0:26 | 0:29 | 0:24 |
| Hardness Shore A | 52 | 53 | 53 | 52 | 51 |
| Tear B, ppi | 270 | 177 | 246 | 283 | 220 |
| Comp. Set at 177° C., 22 hours | 13.0 | 13.3 | 14.0 | 15.0 | 22.6 |

What is claimed is:

1. A curable composition comprising:
   (a) an alkenyl terminated linear diorganopolysiloxane gum;
   (b) an alkenyl containing diorganopolysiloxane gum;
   (c) a precipitated silica reinforcing filler with surface area of from about 90 to 300 m²/g;
   (d) a hydroxy terminated polysiloxane fluid;
   (e) an organohydrogenpolysiloxane;
   (f) an effective amount of a low compression set additive; and
   (g) an effective amount of an addition-cure catalyst wherein the alkenyl terminated linear diorganopolysiloxane gum has the formula:

$$M^{vi}D_xD^{vi}_yM^{vi}$$

where $M^{vi}$ is $R^1R^2_2SiO_{3/2}$

D is $R^3_2SiO_{2/2}$;

$D^{vi}$ is $R^4R^5SiO_{2/2}$;

where $R^1$ and $R^4$ are each independently $(C_2-C_6)$alkenyl, $R^2$, $R^3$ and $R^5$ are each independently $(C_1-C_6)$alkyl or $(C_2-C_6)$alkenyl, and x and y are chosen so that the viscosity of the gum is in the range of from about 1,000,000 to about 200,000,000 centipoise at 25° C., and having an alkenyl concentration of about 0.001 to about 0.01 mole percent of siloxy units and wherein the low compression set additive is an acetylene alcohol having the formula:

$$H-C{\equiv}C-R^{10}-OH$$

wherein $R^{10}$ is a divalent hydrocarbon radical comprising 6 to 40 carbon atoms where the structure of $R^{10}$ may be any combination of linear, branched, aliphatic, aromatic, and olefinic, with the limitation that the alcohol is always α to the acetylene group.

2. The composition of claim 1, wherein $R^1$ and $R^4$ are vinyl.

3. The composition of claim 1, wherein $R^2$, $R^3$ and $R^5$ are each methyl.

4. The composition of claim 1, wherein y is 0.

5. The composition of claim 1, wherein y>0.

6. The composition of claim 1, wherein the hydroxy terminated polysiloxane fluid has the formula:

$$MD_aD^{vi}_bM$$

where M is $R^7R^6_2SiO_{3/2}$,

D is $R^3_2SiO_{2/2}$;

$D^{vi}$ is $R^4R^5SiO_{2/2}$;

where each $R^4$ is independently $(C_2-C_6)$alkenyl, $R^3$ and $R^5$ and $R^6$ are each independently $(C_1-C_6)$alkyl or $(C_2-C_6)$alkenyl, such that the alkenyl content is from 0 to about 2.0 mole percent, $R^7$ is OH, and a and b are chosen such that the viscosity is from about 25 to about 40 centistokes at 25° C.

7. The composition of claim 6, wherein each $R^3$ and $R^5$ and $R^6$ is methyl.

8. The composition of claim 6, wherein $R^4$ is vinyl.

9. The composition of claim 1, wherein the organohydrogenpolysiloxane has the formula:

$$M^HD_cD_d^HM^H$$

where $M^H$ is $R^8R^6_2SiO_{3/2}$, $D^H$ is $R^9R^6SiO_{2/2}$, each $R^6$ is independently $(C_1-C_6)$alkyl or $(C_2-C_6)$alkenyl, $R^8$ and $R^9$ are each H, and c and d are chosen such that the viscosity is from about 10 to about 1000 centipoise at 25° C. and the hydride content is from about 0.05 to about 5.0 percent by weight.

10. The composition of claim 9, wherein each $R^6$ is methyl.

11. The composition of claim 1, wherein the low compression set additive is 9-ethynyl-9-fluorenol.

12. The composition of claim 1, wherein the low compression set additive is peroxide.

13. The composition of claim 12, wherein the peroxide is methylketone peroxide.

14. The composition of claim 1 wherein the low compression set additive is 1-ethynyl-1-cyclohexanol.

* * * * *